(12) United States Patent
Van der Merwe

(10) Patent No.: US 8,225,399 B1
(45) Date of Patent: *Jul. 17, 2012

(54) SYSTEM AND METHOD FOR AVOIDING AND MITIGATING A DDOS ATTACK

(75) Inventor: Jacobus Van der Merwe, New Providence, NJ (US)

(73) Assignee: AT&T Intellectual Property II, LP, Atlanta, GA (US)

(*) Notice: Subject to any disclaimer, the term of this patent is extended or adjusted under 35 U.S.C. 154(b) by 1049 days.

This patent is subject to a terminal disclaimer.

(21) Appl. No.: 11/304,207

(22) Filed: Dec. 14, 2005

(51) Int. Cl.
*G06F 7/04* (2006.01)
*G06F 15/16* (2006.01)
*G06F 17/30* (2006.01)
*H04L 29/06* (2006.01)
*H04N 7/16* (2006.01)

(52) U.S. Cl. .................. 726/23; 726/3; 726/27
(58) Field of Classification Search ............ None
See application file for complete search history.

(56) References Cited

U.S. PATENT DOCUMENTS

| | | | |
|---|---|---|---|
| 6,633,548 B2 * | 10/2003 | Bachmutsky et al. | 370/255 |
| 6,732,279 B2 | 5/2004 | Hoffman | |
| 6,754,699 B2 | 6/2004 | Swildens et al. | |
| 6,772,334 B1 | 8/2004 | Glawitsch | |
| 6,801,503 B1 | 10/2004 | Wetherall et al. | |
| 6,880,090 B1 | 4/2005 | Shawcross | |
| 6,886,102 B1 | 4/2005 | Lyle | |
| 6,930,978 B2 | 8/2005 | Sharp et al. | |
| 2003/0035370 A1 * | 2/2003 | Brustoloni | 370/229 |
| 2005/0276262 A1 * | 12/2005 | Schuba et al. | 370/389 |
| 2006/0047769 A1 * | 3/2006 | Davis et al. | 709/207 |

* cited by examiner

*Primary Examiner* — Nasser Goodarzi
*Assistant Examiner* — Trong Nguyen
(74) *Attorney, Agent, or Firm* — Fay Kaplun & Marcin, LLP

(57) ABSTRACT

A system and method for receiving a data packet including a destination address and a source address, categorizing the data packet into a community based on the source address, wherein the community is predefined by a user corresponding to the destination address and selecting a treatment for the data packet based on the community. The method may be implemented on a router to avoid and/or mitigate the harmful effects of a Distributed Denial of Service ("DDoS") attack on a computer system or network.

18 Claims, 3 Drawing Sheets

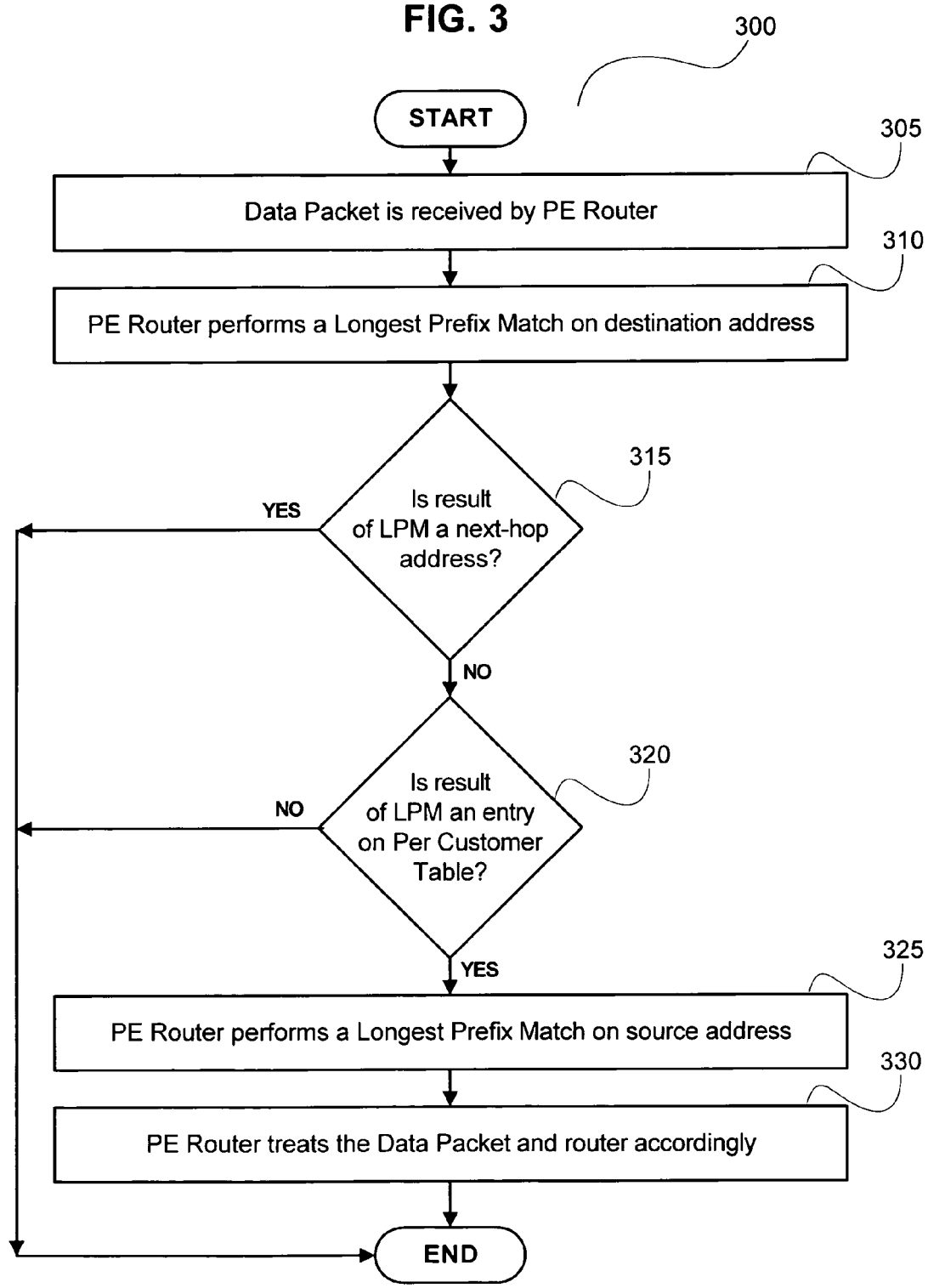

US 8,225,399 B1

SYSTEM AND METHOD FOR AVOIDING AND MITIGATING A DDOS ATTACK

BACKGROUND

The growing problems associated with security exploits within the any-to-any architecture of the Internet are of significant concern to service providers and their customers. These customers are increasingly affected by the damages caused by Denial of Service ("DoS") attacks. A DoS attack is defined as an action taken upon on a computer network or system by an offensive device that prevents any part of the system from functioning in accordance with its intended purpose. This attack may cause a loss of service to the users of the system. Typically, the loss of network services and user connectivity is achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple devices to attack a specific resource of a service provider network. The targeted resource can be any networking device such as routers, Internet servers, electronic mail servers, Domain Name System ("DNS") servers, etc.

The any-to-any architecture of the Internet makes service providers and their customers vulnerable to the growing problems of DDoS attacks. It would be useful for a service provider to offer the customers a means to selectively treat the traffic from certain transmission sources when interacting with the customer. Therefore, the ability to avoid or mitigate the damages of a DDoS attack would be applicable and useful to a customer of a service provider.

SUMMARY OF THE INVENTION

A method for receiving a data packet including a destination address and a source address, categorizing the data packet into a community based on the source address, wherein the community is predefined by a user corresponding to the destination address, and selecting a treatment for a data packet based on the community.

A router having a receiving module receiving a data packet including a destination address and a source address, a routing table categorizing the data packet into a community based on the source address, wherein the community is predefined by a user corresponding to the destination address, and a selection module selecting a treatment for a data packet based on the community.

A computer readable storage medium including a set of instructions executable by a processor. The set of instructions operable to receive a data packet including a destination address and a source address, categorize the data packet into a community based on the source address, wherein the community is predefined by a user corresponding to the destination address, and select a treatment for a data packet based on the community.

BRIEF DESCRIPTION OF THE DRAWINGS

FIG. 3 shows an exemplary method for allowing a customer of a service provider to protect against a DDoS attack according to the present invention.

DETAILED DESCRIPTION

Figure 1:
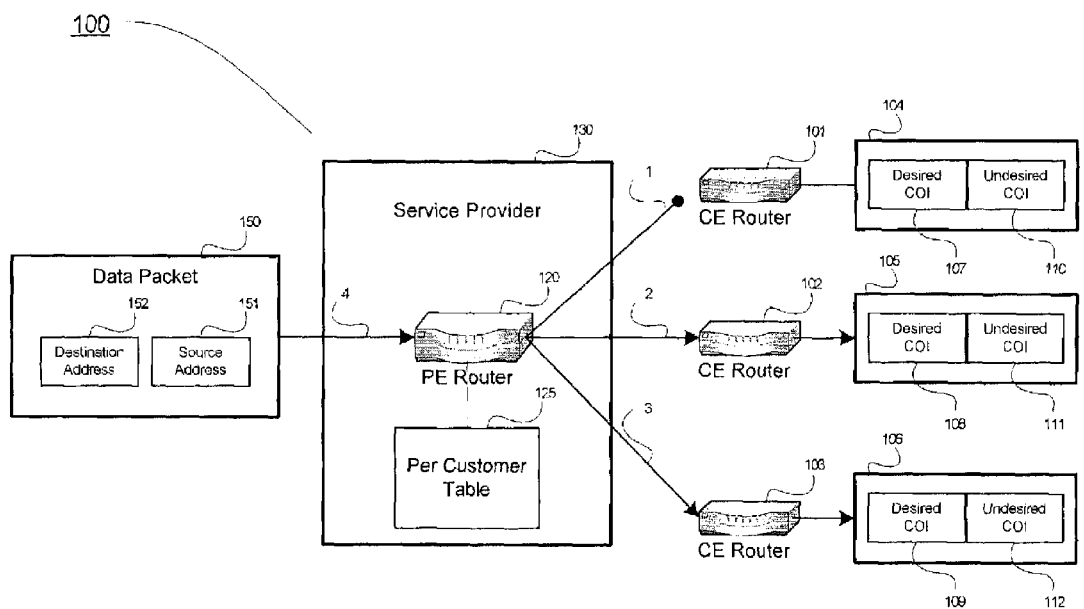
FIG. 1 shows an exemplary IP/MPLS network communications system, in which an embodiment of the present invention may be implemented.

The present invention may be further understood with reference to the following description and the appended drawings, wherein like elements are referred to with the same reference numerals. The exemplary embodiments of the present invention describe a system and method for avoiding and mitigating the harmful effects of a Distributed Denial of Service ("DDoS") attack on a computer system or network. An ordinary denial of service attack, or DoS attack, may be defined as an attack by an offensive device on an automated information system ("AIS") such as network routers, Internet servers, electronic mail servers, Domain Name System servers, etc. Such an attack may cause a loss of service to the network users due to a consumption of network bandwidth or an overload of system resources. The DDoS attack is an enhanced DoS attack in which multiple offensive devices coordinate a simultaneous attack upon a single targeted AIS.

The present invention relates to techniques for allowing customers of a service provider to treat a network security exploit, in particular providing a means for classifying network traffic in order to avoid or mitigate of the effects of a DDoS attack. Through the use of an exemplary service of the present invention, a customer of a service provider may apply selective treatment to inbound network traffic based on the source address of the traffic. Examples of the selective treatment a customer may classify the traffic into include: a priority traffic class, a rate-limited class, and a restricted traffic class.

Throughout this description, the term community of interest ("COI") may be used to describe a selective classification for certain network traffic that may be treated in a distinct manner. A COI may refer to desired network traffic (receiving priority treatment) or undesired network traffic (receiving rate-limited or restrictive treatment). Furthermore, the classification of network traffic may be determined based on the specific prefixes within the Internet Protocol ("IP") addresses of the traffic. Thus, a desired COI may refer to a set of IP prefixes that may be mapped into a priority traffic class. An undesired COI may refer to a set of IP prefixes that may be mapped into a rate-limited traffic class or may be a restricted class, where the traffic is dropped altogether.

In the exemplary embodiments, an exemplary service provider may offer customer-specific services that allows each customer to selectively choose whether or not the inbound network traffic may be classified in COIs based on certain IP prefixes of the traffic. In addition, a customer having a customer edge router ("CE router") connected to a single provider edge router ("PE router") that has multiple customers may independently distinguish the types of inbound network traffic and treat the types of traffic in a manner independent from treatment by the other customers. Therefore, a service provider may offer customer-specific treatment of the network traffic received by a PE router at the discretion of each customer.

The service provider may allow each of its customers to elect whether the customer will use this service ("opt-in"). In other words, a service provider may leave the option to each customer as to selectively treating the traffic, including traffic between customers of the service provider. From one specific customer's perspective, there may be advantages to limiting or restricting the traffic from certain IP prefixes regardless of whether this traffic is permitted into the network by the PE router. If a customer does not want to receive traffic from a certain source, it may be beneficial to the customer to selectively restrict the traffic from that source even if that source may be a subscribing customer of the same service provider. Thus, an embodiment of the present invention may allow a service provider to offer a customer-specific service along the whole path in a provider's network.

The same IP prefixes that are restricted for this particular customer's network traffic may continue to be accessible to either the service provider or the other customers of the service provider. For example, a service provider may have Customer A and Customer B connected to the same PE router. If Customer A selects to have the PE router drop all network traffic from a certain IP prefix, Customer B may still have the ability to receive the network traffic from that same IP prefix.

According to the exemplary embodiments of the present invention, a customer using this service may mitigate the effects of a DDoS attack by first identifying the source of a particular class of network traffic, then specifying how this class of network traffic should be treated. In order to identify the source of particular class, an exemplary customer may select the IP prefixes of the traffic the customer would like to classify into groups of COIs. The priority traffic may be grouped into a desired community, while the restricted traffic may be grouped into an undesired community. Once an IP prefix of traffic has been identified and classified, the customer may select the type of treatment for this traffic. This treatment of the traffic may include, for example, preferential treatment for the desired communities, and rate-limited or dropped treatment for the undesired communities. For example, one customer of the service provider may know the IP prefix of a valued client. Thus, the customer may select to give this IP prefix preferential treatment. In addition, one customer of the service provider may know the IP prefix of a DDoS attack source. Thus, the customer may select to drop any communication from this known source.

In an exemplary embodiment, the present invention may be implemented in an IP/Multi-Protocol Label Switching ("MPLS") based network. Generally, an MPLS-based network gives a network operator a great deal of flexibility in diverting and routing traffic around link failures and congestion. This type of network offers bandwidth management, traffic engineering, and Quality of Service capabilities to an IP network. In other words, the MPLS-based network may be used to increase the speed of network traffic flow by allowing each customer of a service provider to insert information about the specific path a data packet may take en route to its destination. This saves the time needed for a router to look up the IP address for the next node along the traffic flow of the data packet.

An exemplary MPLS-based network includes at least one Label Edge Router ("LE router") and at least one Label Switch Router ("LS router"). When a data packet enters an MPLS-based network, the LE router may give the data packet an identifying label. This label may contain information based on the routing table entry (e.g., destination, bandwidth, delay, and other metrics), and may also refer to the IP header field (source IP address). Once this classification is complete and mapped, the data packet may be assigned to a corresponding Labeled Switch Path ("LS path"), where the LS router places an outgoing label on the data packet. With the LS path, a network operator may divert and route traffic based on data-stream type and Internet-access customer.

The LE router within the MPLS-based network may perform a longest prefix match on a target IP address of the data packet, where the target IP address may be either a destination address or a source address. A longest prefix match may be defined as an algorithm used by routers within an IP network in order to select an entry from a routing table. Given that each entry in a routing table may specify a network, a target address may match more than one routing table entry. The "longest prefix" is the entry with the largest number of leading address bits in the table entry that match the address bits of the target address. The most specific table entry would have the highest subnet mask, and thus would be called the longest prefix match.

For example, a routing table may contain two routing table entries: 192.168.0.0/16 and 192.168.20.16/28. When an LE router within the MPLS-based network needs to look up a target address of 192.168.20.19, both entries will match since both of the table entries contain the target address. The longest prefix of the two table entries is second entry, 192.168.20.16/28, since the subnet mask of "/28" is higher than the subnet mask of the first entry ("/16"). Therefore, the second entry in the routing table is more specific and would be considered the longest prefix match.

FIG. 1 shows an exemplary IP/MPLS network communications system 100, in which an embodiment of the present invention may be implemented. The communications system 100 may include a service provider 130, a PE router 120, a plurality of CE routers 101-103, and a plurality of customers 104-106. According to the present embodiment, CE router 101 is connected to PE router 120 via communication link 1; CE router 102 is connected to PE router 120 via communication link 2; and CE router 103 is connected to PE router 120 via communication link 3.

Each of the customers (104, 105, and 106) may have a desired COI (107, 108, and 109) and an undesired COI (110, 111, and 112, respectively). A desired COI may include a list of certain IP prefixes that a customer has selected to receive preferential treatment. An undesired COI may include a list of certain IP prefixes that a customer has selected to receive negative treatment. In this representation, customer 104 is associated with desired COI 107 and undesired COI 110. The PE router 120 may include a per-customer table 125 that may be defined as a routing entry table associated with a set of each of the IP prefixes of the desired COIs (107-109) and undesired COIs (110-112) as advertised by the corresponding customers (104-106) that subscribe to the service provider 130.

When a data packet 150 enters the communications system 100, it is initially received by the PE router 120 over communication link 4. The received data packet 150 may include a source address 151 and a destination address 152. Upon this reception, the PE router 120 performs a first lookup on the data packet 150. During this first lookup, the PE router 120 performs a first longest prefix match on the destination address 152 of the data packet 150. The result of this first lookup may be either a next-hop address (an IP address of an adjacent host or router to which the data packet 150 should be sent next) or an address within the per-customer table 125 (a table associated with all the IP prefixes selected by the customers (104-106) for special treatment).

The PE router 120 may maintain routing information, logically organized into a routing table. Each entry of the routing table may associate one or more destination IP addresses with a next-hop IP address and a forwarding module (not shown) used to forward a packet to the next-hop IP address. If the destination IP address is local (i.e., can be reached without the aid of a router), the next-hop IP address is zero (or a logical equivalent, such as an IP address associated with the PE router 120). Otherwise, the next-hop IP address may be the address of a next-hop router.

If the result of the lookup is a next-hop address, then the PE router 120 routes the data packet 150 to the destination without any special treatment. If the result of the lookup is within the per-customer table 125, then PE router 120 performs a second lookup on the data packet 150. During this second lookup, the PE router 120 performs a second longest prefix match on the source address 151. The match is compared against the set of IP prefixes of the desired and undesired COIs (107-112) for each of the customers (104-106). The result of this lookup may be an indication of which type of treatment the data packet 150 will receive from the PE router 120. The types of treatment available for the PE router 120 to perform may include: marking the data packet 150 for priority; limiting the transfer rate for the data packet 150; and dropping the transfer of data packet 150. Therefore, the PE router 120 may prevent or limit the data packet 150 from routing to a specific customer if the IP prefix is from one of the undesired COIs (110-112). Conversely, the PE router 120 may provide preferential treatment to the data packet 150 for a specific customer if the IP prefix is within one of the desired COIs (107-109).

In the exemplary illustration of FIG. 1, data packet 150 has a destination address 152 that directs the data packet 150 to be routed by the PE router 120 to customer 104. In addition, the data packet 150 has a source address 151 that contains an IP prefix match within the undesired COI 110 of customer 104. Through the connection over communication link 1, customer 104 has indicated to the service provider 130 that all traffic containing a source address that matches an IP prefix within the undesired COI 107 should be dropped.

It is important to note that while customers 105 and 106 may also be addressed as the destination for data packets from this particular source, the IP prefixes of the source address 151 may not match with undesired COIs 108 or 109 of customers 105 and 106, respectively. Thus, the data packet 150 will not receive any special treatment from the PE router when routed over communication links 2 and 3 to customers 105 and 106, respectively. The selection by customer 104 to drop the transmission containing source address 151 has no effect on the abilities of customers 105 and 106 to receive data transmissions from the same source.

The information regarding the treatment of network traffic for the customers may be included in the per-customer table 125 of the service provider 130. During the first lookup, the PE router 120 may compare the destination address 152 of the inbound data packet 150 to the addresses of the customers (104-106) of the service provider 130. When a customer informs the service provider 130 of any special treatment for inbound network traffic, this treatment selected by the customer may be indicated on the per-customer table 125. Thus, the PE router 120 may reference the table in order to specifically treat specific data transmissions uniquely for each of the customers (104-106).

Since customer 104 has included an IP prefix match of source address 151 within the undesired COI 107, the per-customer table 125 may indicate to the PE router 120 that this traffic should be dropped for customer 104. When the data packet 150 is received by the PE router 120, the data packet 150 will be restricted from traversing along communication link 1 to the CE router 101 of customer 104. However, the PE router 120 will still route the data packet 150 over communication link 2 to CE router 102 and over communication link 3 to CE router 103. As noted above, the treatment selected by customer 104 for data packet 150 will have no impact on the ability for the service provider 130 to receive and route the data packet 150. In addition, data packet 150 will also remain accessible to customers 105 and 106.

Therefore, when this embodiment of the present invention is implemented at the PE router 120 in the network communications system 1, the traffic of a potential DDoS attack originating from any of the undesired COIs may be dropped or constrained before the DDoS can impact a CE router or a customer access link.

Figure 2:
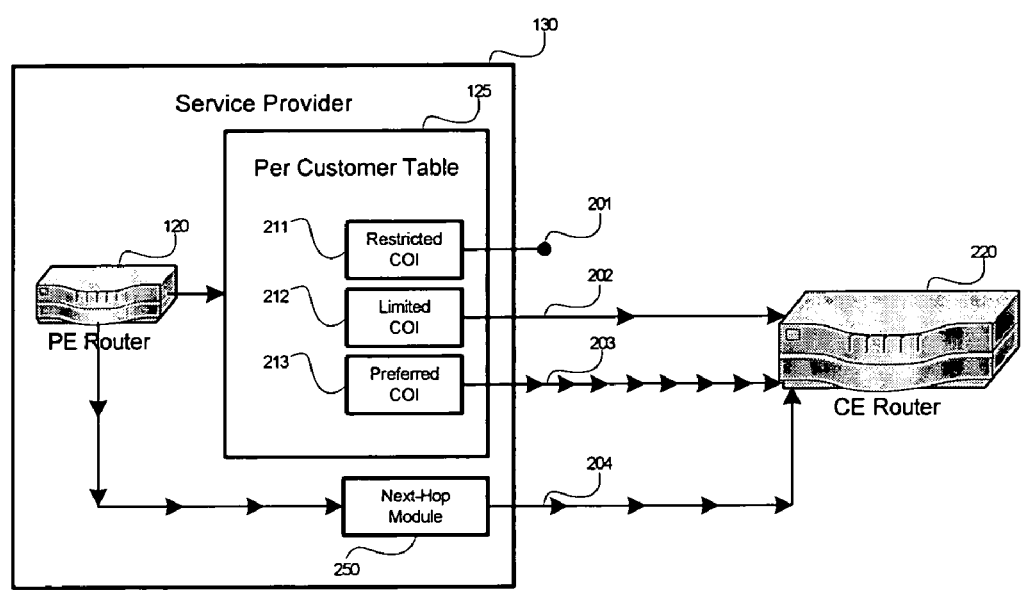
FIG. 2 shows an exemplary illustration of the use of COIs for the transmission of data from a PE router to a CE router according to the present invention.

FIG. 2 shows an exemplary illustration for the use of COIs during the transmission of data from a PE router to a CE router according to the present invention. Depicted in this illustration are four types of routing traffic classes (201, 202, 203 and 204), wherein three of the four types of data packets may be addressed to be routed from PE router 120 to CE router 220. While each of these three traffic classes may be traversed over a single physical connection between the routers, the distinct routing traffic classes are shown as traveling separate paths in FIG. 2 for illustrative purposes. The transmission rate for each type of routing traffic classes are represented by the number of arrows along a given path, where the greater the number of arrows along a traffic class denotes a greater transmission rate for the traffic.

A PE router 120 within the communications network may examine a destination address of data packet that is received by the service provider 130. The result of examination of the destination address may be either a next-hop address or a per-customer table 125. Traffic containing a next-hop address may be routed as per normal routing from a next-hop module 250. As described above, the per-customer table 125 may include a list of the IP prefixes for associated with distinct COIs, each of which the customer has independently selected for special treatment. In this illustration, the customer has established three COIs (211, 212, and 213), which may be contained within the per-customer table 125.

According to this embodiment, the COI 211 is a restricted/undesired COI where PE router 120 will restrict any inbound traffic that contains matching IP prefixes. For example, a customer may select to treat certain traffic in this restrictive manner if the IP prefixes are known or suspected sources of DDoS attacks, and the customer would like to terminate traffic from with this particular source. The COI 212 is a limited/undesired COI, in which the PE router 120 will limit the transmission rate for any inbound traffic that contains matching IP prefixes. For example, a customer may select to treat certain traffic in this rate-limited manner if the IP prefixes are potential sources of DDoS attacks, and the customer would only like to receive a limited amount of traffic from this particular source. The COI 213 is a preferred/desired COI, in which the PE router 120 will give preferential treatment to any inbound traffic that contains matching IP prefixes. For example, a customer may select to treat certain traffic in this preferential manner if the IP prefixes are known clients of the customer. It should be noted that there also may be another class of traffic, i.e. traffic destined for the customer that is not included in any of the COIs 211-213. This traffic may be treated in the same manner as one of the COI types or in the normal manner, e.g., routed as if the present invention was not implemented.

When the PE router 120 performs a first lookup using a longest prefix match on the destination address of a data packet, the result will determine how the data packet is treated. If the result of the first lookup is a next-hop address, the PE router 120 will route a data packet to the CE router 220 via the next-hop module 250 at a standard transmission rate 204. If the result of the first lookup is within the per-customer table 125, then the PE router 120 performs a second lookup using a longest prefix match on the source address of the data packet.

If the result of the lookup is a match against an IP prefix contained in the restricted/undesired COI 211, the PE router 120 will restrict the routing of the data packet to the CE router 220. This restriction is illustrated by the dropped routing traffic rate 201, in which the transmission for this traffic may be terminated at the PE router. Thus, the customer may be able to prevent the transmission from a source address within COI 211, before the transmission reaches the CE router 220. If the result of the lookup is a match against an IP prefix contained in the limited/undesired COI 212, the PE router 120 will transmit the data packet to the CE router 220 via the limited transmission rate 202. Thus, the customer would be able to limit the transmission rate from a source address with COI 212. If the result of the lookup is a match against an IP prefix contained in the preferred/desired COI 213, the PE router 120 will transmit the data packet to the CE router 220 via the preferred transmission rate 203. Thus, the customer would be able to mark the transmission from a source address within COI 213 for priority transmission.

In the exemplary embodiment of FIG. 2, the PE router 120 is shown as being directly connected to the CE router 220. However, the PE router 120 may be indirectly connected to the CE router 220. For example, there may be additional intervening router(s) located at either the customer premises and/or within the provider network. It should also be noted that the arrangement shown in FIG. 2 shows the PE router 120 as an egress router relative to the CE router 220, i.e., the router from which the CE router 220 will receive data from the provider network. However, the present invention may also be implemented on an ingress router, i.e., the network provider router from which the data destined for CE router 220 originally enters the provider network, or any other router within the provider network.

FIG. 3 shows an exemplary method 300 for allowing a customer of a service provider to protect against a DDoS attack through selective treatment of network traffic by a PE router 120. The method begins with step 305 where a data packet is received by the PE router 120 within a network communications system 100. It should be noted that throughout this description, it has been assumed that the system and method of the present invention uses a single PE router within a network to protect against a DDoS attack. However, it may be that there is a plurality of PE routers within the network that may functionally cooperate to perform the method of the present invention. For example, a network may include a plurality of PE routers and all of the PE routers are implemented within an exemplary network of the present invention. The traffic for a DDoS attack originating from a customer's undesired set of IP prefixes may be dropped by the cooperating PE routes long before the attack can have any significant effect on the customers servers or network accessibility.

In step 310, the PE router 120 performs a longest prefix match on the destination address in the received data packet. As described above, the longest prefix match refers to an algorithm used by a network router in order to select an entry from a routing table. In this case, the longest prefix match may be used to compare the destination address of the data packet to the IP addresses of each of the customers subscribing to the PE router 120. Thus, when a specific IP address is looked up by the PE router 120, the result is compared to the IP address for each of the customers of the service provider.

In step 315, the PE router determines whether the result of the lookup is a next-hop address. A next-hop address is an IP address of an adjacent router to which the data packet should be sent to next. If the result of the lookup is a next-hop address, the data packet receives no special treatment by the PE router 120 and is routed as per normal routing.

In step 320, the PE router 120 determines whether the lookup result is on the per-customer table 125. The per-customer table is a routing table containing all of the IP prefixes that are to receive special treatment from the service provider, as per the distinctive selection of each customer. If the result of the lookup is not on the per-customer table, the data packet receives no special treatment by the PE router 120 and is routed as per normal routing. However, if the result of the lookup is on the per-customer table, the PE router performs a second lookup.

In step 325, the PE router performs a longest prefix match on the source address of the data packet. The source address is matched against the set of IP prefixes contained within the COIs and the result of this match may act as an indication to the PE router as to how the traffic should be treated. Finally, in step 330 the PE router treats the data packet based on the result of the longest prefix match of the source address of the data packet. The types of treatment the PE router may perform include: dropping traffic from restricted IP prefixes; limiting traffic from rate-limited IP prefixes; and marking traffic priority from preferred IP prefixes. Thus, if this functionality is deployed at a plurality of PE routers in a network, DDoS traffic originating from a restricted set of IP prefixes can be dropped at the PE router before the traffic can impact customer. Since a customer may not need the any-to-any capabilities provided by the Internet, the present invention can be useful to allow the customer to protect itself from a DDoS attack by way of selective treatment to the inbound network traffic.

It should be noted that the present invention may be implemented within an exemplary network having Quality of Service ("QoS") capabilities. Those of skill in the art will recognize that a network having QoS may be able to accommodate different levels of service than a network not having QoS. Thus, a QoS network may offer the customer multiple levels of COIs to treat incoming traffic. The present invention offers customers of a service provider with the ability to set limitations within the any-to-any communication of the Internet. Any-to-any communication may refer to the ability to effectively support communication between all types of networking devices. In addition to allowing the customer to designate desired and undesired communities based on the IP prefixes of the traffic, the present invention may also be used to provide the customer with other options for the treatment of the traffic.

Furthermore, it should be noted that the present invention may also be implemented in a best effort network. An IP network described as a best effort network may refer to an approach to service quality where the network itself does not actively differentiate in its treatment of services that transit the network. In a best effort network, here the choice of treatment for the traffic by a PE route may be limited to either dropping the traffic from specifically selected IP prefixes or allowing the traffic to go through for other selected IP prefixes. Unlike a network having quality of service capabilities, a router within a best effort IP network treats all IP packets in the same fashion. The network undertakes its "best effort" to deliver every packet as quickly as it can, but makes no undertaking to treat any class of packets preferentially to any other.

In one exemplary embodiment of the present invention, a customer of a service provider may be aware of which IP prefixes the customer would like for each class of treatment based on the business relationships of the customer. In other words, the customer may choose to place a known IP prefix of a valued client into the desired community, thereby giving preferential treatment to any traffic from this IP prefix. For example, an organization having multiple operating sites may select to allow for communication traffic only between the different operating sites of the organization. Using this scheme, the organization may drop all other Internet traffic. Therefore, the functionality of this embodiment is similar to the functionality provided by a virtual private network.

In another exemplary embodiment of the present invention, the service provider may rank all of the IP prefixes based on the number of instances in which each IP prefix was involved with a prior DDoS attack. According to this embodiment, an IP prefix that was associated with a large number of DDoS attack may be ranked high. The service provider may supply a customer with the rankings in order to show which specific IP prefixes are more likely to be associated with a similar or repeating DDoS attack. Thus, the customer may be given the option to select that some or all of the IP prefixes associated with a prior DDoS attack may receive restrictive treatment, as an undesired community. In addition, the service provider may also rank all of the IP prefixes based on how recently a DDoS attack was associated with each IP prefix. Thus, a customer may be given the option to select restrictive treatment for some or all IP prefixes associated with a DDoS within a specified historic time frame. Furthermore, a customer of a service provider may choose to automate the treatment of the ranked IP prefixes. Thus, as the service provider updates the rankings by adding or removing IP prefixes, the customer may automatically treat the network traffic as undesired community without the customer specifying the IP prefix.

It will be apparent to those skilled in the art that various modifications may be made in the present invention, without departing from the spirit or scope of the invention. Thus, it is intended that the present invention cover modifications and variations of this invention provided they come within the scope of the appended claims and their equivalents.

What is claimed is:

1. A non-transitory computer readable storage medium storing a set of instructions executable by a processor, the set of instructions being configured to performing a method comprising:
   receiving a data packet including a destination Internet Protocol ("IP") address and a source IP address;
   comparing the destination IP address of the data packet to a customer IP address;
   retrieving a per-customer table corresponding to the customer IP address;
   comparing the source IP address to the per-customer table;
   categorizing the data packet into a community relating to one of a desired group of senders and an undesired group of senders by determining an association between the source IP address and the community, the association being a similarity of the source IP address to a plurality of source IP addresses corresponding to the one of the desired group of senders mad the undesired group of senders in the community, the similarity relating to a longest IP prefix match, wherein the community is predefined by a user corresponding to the destination IP address and described in the per-customer table wherein the predefining of the community by the user comprises selecting IP prefixes for the community from a list of IP prefixes provided by a service provider, the list being ranked by a recency of a most recent attack related to each of the IP prefixes of the list; and
   selecting a treatment for the data packet based on the community.

2. The non-transitory computer readable storage medium of claim 1, wherein the treatment includes restricting further transmission of the data packet.

3. The non-transitory computer readable storage medium of claim 1, wherein the treatment includes limiting a rate of transmission of the data packet.

4. The non-transitory computer readable storage medium of claim 1, wherein the treatment includes prioritizing transmission of the data packet.

5. The non-transitory computer readable storage medium of claim 1, wherein the treatment includes transmitting the data packet to a customer router corresponding to the destination IP address.

6. The non-transitory computer readable storage medium of claim 1, wherein the per-customer table includes a plurality of communities.

7. The non-transitory computer readable storage medium of claim 1, wherein the comparing the destination IP address includes performing a longest prefix match on the destination IP address.

8. The non-transitory computer readable storage medium of claim 1, wherein the comparing the source IP address includes performing a longest prefix match on the source IP address.

9. The non-transitory computer readable storage medium of claim 1, wherein the community is predefined by the user based on IP prefixes.

10. A router, comprising:
    a network adapter;
    a receiving module receiving a data packet including a destination Internet Protocol ("IP") address and a source IP address;
    a first comparator module comparing the destination IP address of the data packet to a customer IP address;
    a retrieving module retrieving a per-customer table corresponding to the customer IP address;
    a second comparator module comparing the source IP address to the per-customer table;
    a routing table categorizing the data packet into a community relating to one of a desired group of senders and an undesired group of senders by determining an association between the source IP address and the community, the association being a similarity of the source IP address to a plurality of source IP addresses corresponding to the one of the desired group of senders and the undesired group of senders in the community, the similarity relating to a longest IP prefix match, wherein the community is predefined by a user corresponding to the destination IP address and described in the per-customer table, wherein the predefining of the community by the user comprises selecting IP prefixes for the community from a list of IP prefixes provided by a service provider, the list being ranked by a recency of a most recent attack related to each of the IP prefixes of the list; and
    a selection module selecting a treatment for a data packet based on the community.

11. The router of claim 10, wherein the treatment includes restricting further transmission of the data packet.

12. The router of claim 10, wherein the treatment includes limiting a rate of transmission of the data packet.

13. The router of claim 10, wherein the treatment includes prioritizing transmission of the data packet.

14. The router of claim 10, wherein the treatment includes transmitting the data packet to a customer router corresponding to the destination IP address.

15. The router of claim 10, wherein the per-customer table includes a plurality of communities.

16. The router of claim 10, wherein the first comparator module comparing the destination IP address includes performing a longest prefix match on the destination IP address.

17. The router of claim 10, wherein the second comparator module comparing the source IP address includes performing a longest prefix match on the source IP address.

18. The router of claim 10, wherein the community is predefined by the user based on IP prefixes.

* * * * *